United States Patent [19]

Grubba

[11] Patent Number: 5,773,496
[45] Date of Patent: Jun. 30, 1998

US005773496A

[54] POLYMER ENHANCED ASPHALT

[75] Inventor: William E. Grubba, Red Lion, Pa.

[73] Assignee: Koch Industries, Inc., Wichita, Kans.

[21] Appl. No.: 656,058

[22] Filed: May 31, 1996

[51] Int. Cl.$^6$ ..................................................... C08L 95/00
[52] U.S. Cl. ............................................................ 524/68
[58] Field of Search .................................................. 529/68

[56] References Cited

U.S. PATENT DOCUMENTS

| | | | |
|---|---|---|---|
| H876 | 1/1991 | Gilmore et al. | 524/68 |
| 4,145,322 | 3/1979 | Maldonado et al. | 260/28.5 |
| 4,242,246 | 12/1980 | Maldonado et al. | 260/28.5 |
| 4,330,449 | 5/1982 | Maldonado et al. | 524/68 |
| 4,418,167 | 11/1983 | Böhm et al. | 524/68 |
| 4,419,469 | 12/1983 | Böhm et al. | 524/68 |
| 4,464,427 | 8/1984 | Barlow | 428/40 |
| 4,530,652 | 7/1985 | Buck et al. | 428/291 |
| 4,554,313 | 11/1985 | Hagenbach et al. | 525/54.5 |
| 4,559,267 | 12/1985 | Freshwater et al. | 428/352 |
| 4,824,880 | 4/1989 | Algrim et al. | 524/62 |
| 4,835,199 | 5/1989 | Futamura et al. | 524/66 |
| 4,923,913 | 5/1990 | Chich et al. | 524/62 |
| 4,973,615 | 11/1990 | Futamura et al. | 524/66 |
| 5,036,119 | 7/1991 | Berggren | 523/351 |
| 5,100,938 | 3/1992 | Vituske et al. | 524/68 |
| 5,100,939 | 3/1992 | Vitkuske et al. | 524/68 |
| 5,182,319 | 1/1993 | Mitchell | 524/68 |
| 5,234,999 | 8/1993 | Tung et al. | . |
| 5,266,615 | 11/1993 | Omeis et al. | 524/69 |
| 5,272,214 | 12/1993 | Custro et al. | 525/314 |
| 5,288,773 | 2/1994 | Gorbaty et al. | 524/68 |
| 5,314,935 | 5/1994 | Chaverot et al. | 524/64 |
| 5,328,943 | 7/1994 | Isobe et al. | 524/70 |
| 5,342,866 | 8/1994 | Trumbore et al. | 524/68 |
| 5,371,121 | 12/1994 | Bellomy et al. | 524/68 |
| 5,380,552 | 1/1995 | George et al. | 427/186 |
| 5,380,773 | 1/1995 | Bellio et al. | 524/68 |
| 5,393,819 | 2/1995 | Peters | 524/406 |
| 5,399,598 | 3/1995 | Peters | 524/68 |

FOREIGN PATENT DOCUMENTS

| | | |
|---|---|---|
| 0 587 360 A | 3/1994 | European Pat. Off. . |
| 2360630 | 3/1978 | France . |
| 009072 | 4/1994 | WIPO ..................................... 524/68 |

Primary Examiner—Peter A. Szekely
Attorney, Agent, or Firm—Shook, Hardy & Bacon

[57] ABSTRACT

The present invention relates to an asphalt composition prepared from bitumen (asphalt), linear and non-linear copolymers of styrene and butadiene, and elemental sulphur. The present invention compositions are useful for industrial applications, such as hot mix asphalts used with aggregates for road paving, and repair.

11 Claims, No Drawings

POLYMER ENHANCED ASPHALT

FIELD OF THE INVENTION

The invention relates to a unique cross-linked dual copolymer and asphalt (bitumen) composition and process.

BACKGROUND OF INVENTION

Asphaltic concrete, typically including asphalt and aggregate, and asphalt compositions for resurfacing asphaltic concrete must exhibit a certain number of specific mechanical properties to enable use in their various fields of application, especially when the asphalts are used as binders for superficial coats (road surfacing) or in industrial applications. (The term "asphalt" is used herein interchangeably with "bitumen." Asphaltic concrete is asphalt used as a binder with appropriate aggregate added, typically for use in roadways.) The use of asphalt binders either in maintenance facings as a surface coat or as a very thin bituminous mix, or as a thicker structural layer of bituminous mix in asphaltic concrete, is enhanced if these binders possess the requisite properties such as elasticity and plasticity.

Previously, various polymers have been added to asphalts to improve physical and mechanical performance properties. Polymer-modified asphalts are routinely used in the road construction/maintenance and roofing industries. Conventional asphalts often do not retain sufficient elasticity and exhibit a plasticity range which is too narrow for use in much modern road construction. It is known that the characteristics of such road asphalts can be greatly improved by incorporating into them a polymer of elastomeric type which may be one such as butyl, polybutadiene, polyisoprene or polyisobutene rubber, ethylene/vinyl acetate copolymer, polyacrylate, polymethacrylate, polychloroprene, polynorbornene, ethylene/propylene/diene (EPDM) terpolymer and advantageously a random or block copolymer of styrene and a conjugated diene. The modified asphalts thus obtained are commonly referred to variously as bitumen/polymer binders or asphalt/polymer mixes. Modified asphalts are typically produced utilizing styrene/butadiene based polymers, and typically have raised softening point, increased viscoelasticity, enhanced force under strain, enhanced strain recovery, and improved low temperature strain characteristics.

The bituminous binders, even of the bitumen/polymer type, which are employed at the present time in road applications often do not have the optimum characteristics at low enough polymer concentrations which would make it possible to consistently meet the increasing structural and workability requirements imposed on roadway structures and their construction. In order to achieve a given level of modified asphalt performance, various polymers are added at some prescribed concentration. Current practice is to add the desired level of a single polymer, sometimes along with a reactant which promotes cross-linking of the polymer molecules until the desired asphalt properties are met. This reactant typically is sulphur in a form suitable for reacting. Such current processes are discussed in various patents such as U.S. Pat. Nos. 4,145,322 (Maldonado); 5,371,121 (Bellamy); and 5,382,612 (Chaverot), all of which are hereby incorporated by reference. However, cost of the added polymer adds significantly to the overall cost of the resulting asphalt/polymer mix. Thus, cost factors weigh in the ability to meet the above criteria for various asphalt mixes. In addition, at increasing levels of polymer concentration, the working viscosity of the asphalt mix becomes excessively great and separation of the asphalt and polymer may occur. Thus, although enhancing most properties of the final product, additional amounts of a single polymer and reactant is effectively limited to levels not producing excessively viscous (stiff) working mixes and maintaining a viable nonseparating product.

Accordingly, there is a need to enhance control of various characteristics of asphalt while minimizing use of the polymer additives.

SUMMARY OF INVENTION

The present invention, addressing the needs described above, is a new polymer-enhanced asphalt that utilizes effective amounts of each of two types of polymers or components thereof: a non-linear (e.g., multi-armed or multi-branched or radial) styrene/conjugated diene copolymer component, such as styrene/butadiene/styrene (SBS) copolymer, and a linear styrene/conjugated diene copolymer component such as SB copolymer, that, along with effective amounts of sulphur, are all added to asphalt in order to enhance the final viscosity and ductility characteristics of the asphalt/polymer mix while minimizing overall polymer additives so as to minimize cost and maintain workability of the asphalt/polymer mix. The present invention includes the composition of the additives, the resulting asphalt-polymer mix, as well as asphaltic concretes utilizing the asphalt/polymer mix and, also, includes processes for formulation and use of the compositions. The present invention forms what may be referred to as an asphalt dual polymer composite matrix.

The present invention unexpectedly provides enhanced asphalt performance characteristics at significantly lower levels of overall polymer. This results in greatly enhanced workability of the asphalt/polymer mix when achieving the same performance characteristics. Further, when necessary, this allows for enhanced durability-related properties while maintaining an acceptable level of overall polymer and, thus, acceptable workability.

The present invention process includes a process for formulating a bitumen-polymer composition comprising combining from about 80 to about 99.5 percent by weight of an asphalt with from about 20 to about 0.5 percent by weight of a dual polymer mix, where the polymer mix comprises a radial copolymer component which is a radial styrene-conjugated diene block copolymer with a weight average molecular weight ($M_w$) between about 75,000 and 400,000 and a linear copolymer component which is a linear conjugated styrene-conjugated diene di-block copolymer with a weight average molecular weight $M_w$ from about 50,000 to about 300,000, and where the radial copolymer and the linear copolymer are in the ratio of from about 50:50 by weight to about 2.5:97.5 by weight, respectively; adding from about 0.5 to about 10 percent by weight as compared to said polymer mix of elemental sulphur (preferably 1–6 percent, more preferably 2–4 percent by weight); mixing the asphalt, polymer mix and sulphur at a temperature of from about 280° Fahrenheit (F.) to about 450° F.(138° to 232° C.) (preferably 350° F. to about 380° F.(177°to 193° C.)).

DESCRIPTION OF THE INVENTION

The composition of the present invention is a composition of asphalt, linear and radial styrene-conjugated diene copolymer components, and a reactant (typically sulphur). The present invention also includes the process for formulating and use of this composition.

The asphalt used in the present invention includes the various substitute substances for standard crude oil residuum asphalt, including petroleum pitch, synthetic resin, re-refined lube oils and greases, shale oil derivatives, coal tar, petroleum extracts or similar substances used for commercial asphalt.

The linear and radial styrene-conjugated diene copolymer components for use in the present invention include:

Linear di-block styrene-butadiene copolymers (typically 50,000–350,000 molecular weight, $M_w$)

Linear tri-block styrene-butadiene copolymers (typically 50,000–400,000 molecular weight, $M_w$)

Radial block styrene-butadiene-styrene copolymers (typically 50,000–400,000 molecular weight, $M_w$)

The linear and radial copolymer components may be combined from separate copolymer sources, or produced together within a single copolymer as partially radialized linear copolymers. The copolymers used in the process according to the invention are block copolymers, comprising styrene groups and conjugated or partially conjugated diene groups. For example, the conjugated diene groups can be, among others, butadiene and isoprene. Needless to say, the copolymers may contain several different diene groups. Further, it is apparent that the copolymers could contain various styrene based blocks, elastomeric rubber-based blocks and other elastomeric components such as butadiene, isoprene, natural rubber, and mixtures thereof, or have functionalized polymer components containing functionalities such as carboxyl, aminated or epoxide functionalities.

The reactant which forms a part of this composition is used to link a portion of the bonds between copolymer molecules. For various cost and availability reasons, the typical reactant will be elemental sulphur. In addition, other reactants, such as hydrocarbylpolysulphides, sulphur-donating vulcanization accelerators and vulcanization accelerators which do not donate sulphur may be used.

When the linear di-block polymers and radial block polymers are simultaneously combined in asphalt, and then reacted with sulphur, significant property enhancements occur as compared to single sulphur-reacted copolymers. The enhancements are more than can be achieved by using individual unreacted typical di-, tri-, or radial block copolymers by themselves in asphalt, or than can be achieved by using individual typical di-, tri-, or radial block copolymers reacted with sulphur in asphalt.

The present invention consists of the incorporation of a styrene-conjugated diene linear block copolymer in concert with the utilization of a styrene-conjugated diene-styrene radial block copolymer at various proportions and molecular weights. This composition may be dissolved in various asphalt mediums. The mix of asphalt and dual copolymers is then vulcanized with the utilization of sulphur as a cross linking agent and electron donor. The product and material generated from this particular method/process generates a material that most definitely possesses characteristics which are unique only to this system.

Some work has been performed in the art with unreacted mixes of linear and radial copolymers combined with asphalt, apparently to enhance miscibility characteristics of the radial components. However, based upon prior experience, no particular significant benefits accrue with the unreacted mix similar to the benefits occurring in the present invention.

The present invention material yields exceptional synergistic effects with respect to softening points, as well as other properties for a given concentration of total polymer utilized and present in an asphalt mixture. Utilizing typical and common commercial asphalts, softening points have been observed to be in excess of 20° F. higher than that of typical single reacted polymer systems with essentially the same quantity of total polymer utilized. Additionally, when used in commercially available asphalt with undesirable characteristics which typically required a 6.25 to 6.5% by weight single reacted polymer loading, the present invention material yielded the same softening point as the control with nearly a 25% reduction of total polymer usage, thus again demonstrating a unique and unexpected synergy between the two types of polymers combined in the present invention.

DESCRIPTION OF THE PREFERRED EMBODIMENT

Depending upon the particular use characteristics to be met (e.g., SHRP range, viscosity, elasticity, softening point) varying amounts of linear and radial copolymer components may be used within the limits discussed herein. Thus, the composition of the preferred embodiment of the present invention is comprised of effective amounts of linear and radial copolymers and a reactant. As used herein, "effective amounts" indicates the percentages of the various components, asphalt, linear and radial copolymers, and reactant to satisfactorily meet the performance criteria desired.

As discussed further below, other performance-related properties were evaluated with the present invention which include SHRP criteria, Rutting Resistance (Hamburg), force ductility, and other procedures normally used in determining elastomeric behavior and its effects.

Satisfactory results are anticipated for various applications for a total percent by weight of copolymer and reactant of 0.5 to 20 percent by weight of the overall asphalt mix (asphalt and copolymer, excluding any aggregate). For use in many construction applications, a narrower mix of from about 1 to 10 percent may be appropriate to meet the constraints involved. In particular, where working viscosity of the asphalt mix is a concern, total percent weight of copolymer and reactant likely should be held to under 5 percent by weight of the overall asphalt mix.

Without limiting variations, the general process of the present invention is that asphalt is preheated to a temperature of from about 280° Fahrenheit (F.) to about 450° F. (138° to 232° C.) (preferably 350° F. to about 380° F. (177° to 193° C.)). The radial copolymer component is added to the asphalt and agitated until mixed. The linear copolymer component is added to the mixture and agitated for about 2–4 hours, or until an homogeneous dispersion is achieved. Sulphur is added to bring the sulphur level up to the desired concentration. About thirty to sixty minutes of reaction time is desirable. Longer or shorter times may be necessary depending on the specific concentrations of asphalts and manufacturing system used. The final concentration of the present invention asphalt dual polymer composite matrix system may be adjusted using additional asphalt or other natural or synthetic diluents to meet the final desired performance properties.

EXAMPLES #1–3

The polymers shown were blended into the asphalt, then unreacted sulphur was added and allowed to react for approximately 45 minutes. The polymers used for these examples are:

Linear conjugated styrene-butadiene di-block copolymer with typical molecular weight $M_w$ of 100,000

Radial conjugated styrene-butadiene block copolymer with typical molecular weight $M_w$ of 300,000

The asphalt tested in Tables 1–3 is a standard, commercially-available asphalt, AASHTO Table 2 Grade AC-20. Control samples were mixed with a single commercially-available linear copolymer of the type noted and represent typical results for single reacted asphalt/copolymer systems.

the present invention over the single reacted copolymers: that a typical single reacted copolymer formulation would require approximately an additional 2–3 percent total copolymer to be similar in SHRP performance to the present invention.

TABLE #1

| Example | Asphalt (AC-20) (% wt) | Linear copolymer (% wt) | Radial copolymer (% wt) | Sulphur Ratio (Polymer/Sulphur by weight) | Softening Point (F) | Force Ductility | | SHRP | | |
|---|---|---|---|---|---|---|---|---|---|---|
| | | | | | | @ 10c m | 30 cm (Pounds Ratio) | Temp Range (degree F) | Elastic Recovery (%) | Aged Ductility (cm @ 39.2 F) |
| Control 1 | 97.00 | 3.00 | 0.00 | 32.0:2 | 139.1 | 0.14 | 0.49 | — | 85.0 | 0.5 |
| Control 1A | 97.00 | 3.00 | 0.00 | 30.0:1 | — | — | — | 160.6 | — | — |
| Example 1 | 97.00 | 2.25 | 0.75 | 32.5:1 | 153.7 | 0.28 | 0.72 | 170.3 | 87.5 | 7.7 |
| Control 2 | 96.00 | 4.00 | 0.00 | 32.0:1 | 156.2 | 0.31 | 0.78 | — | 87.5 | 0.5 |
| Example 2 | 96.50 | 2.98 | 0.52 | 32.5:1 | 158.0 | 0.33 | 0.94 | — | 92.5 | 7.7 |
| Example 3 | 96.00 | 3.00 | 1.00 | 32.5:1 | 163.9 | 0.40 | 1.03 | — | 86.3 | 8.3 |

TABLE 2

| Sample # | Asphalt (AC-20) % Weight | Linear Copolyer, % Weight | Radial Copolymer % Weight | Sulphur Ratio (Polymer/Sulphur) | SHRP Temp Range °F. |
|---|---|---|---|---|---|
| Comparative 1 | 96.55 | 3.45 | 0.0 | 28:1 | 181.8 |
| Comparative 2 | 97 | 2.55 | .45 | 28:1 | 192.6 |

Generally, examples #1, #2 and #3 demonstrate the higher softening point and improved aged low temperature ductile capabilities using present invention reacted dual polymer components as compared to existing single reacted polymer systems. These very significant improvements in aged ductility are also noted in the test data, indicate an increased performance life of the present invention.

The softening point information shown relates to the temperature at which the product asphalt first softens and is an indication of performance in use at higher temperatures (e.g., in the summer). The present invention consistently shows significant increase in this value for similar total polymer contents (control 1 vs. example 1—a 14.6° F. increase; control 2 vs. example 3—a 7.1° F. increase.) Also, similar softening points are achieved for significant reductions in total polymer content. (Example 1 vs. control 2; a 25% reduction in polymer results in only a 2.5° F. depression of the softening point.).

Other relevant criteria for asphalt performance is the Strategic Highway Research Properties (SHRP) tests. These tests indicate the visco-elastic and service performance related properties of asphalt composition and were developed to classify materials based upon performance. The SHRP test measures the spread between the low temperature service rating for the material (generally based upon embrittlement cracking) and the high temperature service rating for the material (generally based upon heat softening) to determine a service temperature range. The greater the SHRP temperature range rating, the greater the service range for the material. The SHRP information obtained in Table 1 indicates an increased temperature range of over 10° F. with the present invention as compared to that of a typical single copolymer formulation with a similar concentration of total copolymer. Additionally, Table 2 shows over a 10° F. enhancement in the present invention in the SHRP range for a smaller (3.45 versus 3 percent) amount of total copolymer. Thus, this data illustrates a significant advantage in utilizing The performance differential indicated by the SHRP criteria was also observed by using a Hamburg Wheel tracking device. The Hamburg Wheel tests a material's rutting tendencies and performance life and how a binder (here the asphalt/polymer) influences these criteria. Tests indicate that the present invention with a 3–3.5 percent by weight total copolymer achieved the same results as a typical single reacted copolymer at a 5 percent by weight concentration.

Force ductility tests indicate flow resistance under load and were conducted at 77° F. as is called for in various government asphalt testing requirements. The results in Table 1 indicate a significantly better (increased) resistance to flow with equivalent amounts of total copolymer. To put these results in perspective, some government specifications currently require a minimum of 0.25 pounds force ductility for the 10 cm test. The conventional single copolymer shown required about 4 percent copolymer to satisfy this criteria. However, samples at this level of total copolymer were observed to have significant separation problems (separation of copolymer from asphalt, producing surface failures). The present invention meets the same criteria with about 25 percent less total copolymer and without the separation problems experienced with the single copolymer.

Elastomeric properties or elastic recovery is another indication of performance. The Table 1 test results indicate that the dual copolymer material generally meets or exceeds similar amounts of a single reacted copolymer. Other tests indicate that the present invention generally achieves significantly greater elastic recovery ratios than a single reacted copolymer for the same overall polymer loading, further indicating very favorable elastic properties of the present invention.

As discussed above, working viscosity increases significantly with increased copolymer loading. In Table 3, examples 4 & 5 demonstrate that the present invention experiences similar increases in viscosity, here measured by standard Brookfield viscosity tests, and is in the same range of values (example 5 vs. comparative 3). However, because the present invention achieves required operating characteristics using smaller amounts of total copolymer, the working viscosity using the present invention will be lower, significantly enhancing the constructability characteristics for the desired application.

TABLE 3

| Sample # | Asphalt (AC-20) % Weight | Di-block copolymer, % Weight | Radial copolymer % Weight | Sulphur Ratio (Polymer/Sulphur) | Brookfield Viscosity (Centipoise) |
|---|---|---|---|---|---|
| Example 4 | 97 | 2.25 | .75 | 32.5:1 | 1120 |
| Example 5 | 96 | 3.0 | 1.0 | 32.5:1 | 1730 |
| Comparative 3 | 96 | 4 | 0.0 | 30:1 | 1840 |
| Comparative 4 | 95¾ | 4¼ | 0.0 | 32:1 | 2373 |
| Comparative 5 | 94 | 6 | 0.0 | 30:1 | 4200 |

What is claimed is:

1. A asphalt-polymer composition comprising;
   asphalt,
   effective amounts of a polymer-sulphur mix combined with said asphalt, where said polymer-sulphur mix is comprised of a radial copolymer which is a radial styrene-conjugated diene block copolymer with a weight average molecular weight ($M_w$) between about 75,000 and 400,000 and a linear copolymer which is a linear styrene-conjugated diene di-block copolymer with a weight average molecular weight ($M_w$) from about 50,000 to about 300,000 and where said radial copolymer and said linear copolymer are in a ratio effective to of from about 50 to 50 percent by weight to about 2.5 to 97.5 percent by weight, respectively,
   effective amounts of sulphur, where effective amounts are amounts required to meet desired performance characteristics.

2. An asphalt-polymer composition comprising:
   from about 80 to about 99.5 percent by weight of an asphalt
   from about 20 to about 0.5 percent by weight of a polymer-sulphur mix, where said polymer-sulphur mix is comprised of a radial copolymer which is a radial styrene-conjugated diene block copolymer with a weight average molecular weight ($M_w$) between about 75,000 and 400,000, a linear copolymer which is a linear styrene-conjugated diene di-block copolymer with a weight average molecular weight ($M_w$) from about 50,000 to about 300,000, where said radial copolymer and said linear copolymer are in the ratio of from about 50 to 50 percent by weight to about 2.5 to 97.5 percent by weight respectively, and sulphur in the amount of about 0.5 to about 10 percent by weight of the polymer-sulphur mix.

3. An asphalt-polymer composition as claimed in claim 2 wherein:
   said asphalt percent by weight is from about 90 to about 99 percent by weight of the asphalt-polymer composition and said polymer-sulphur mix is from about 10 to about 1 percent by weight of the asphalt-polymer composition, and said sulphur percent is from about 2 to about 4 percent by weight of said polymer-sulphur mix.

4. An asphalt-polymer composition as claimed in claim 2 wherein:
   said asphalt percent by weight is from about 95 to about 99 percent by weight of the asphalt-polymer composition and said polymer-sulphur mix is from about 5 to about 1 percent by weight of the asphalt-polymer composition, said sulphur percent is from about 2 to about 4 percent by weight of said polymer-sulphur mix, and where said radial copolymer and said linear copolymer are in the ratio of from about 25 to 75 percent by weight to about 2.5 to 97.5 percent respectively.

5. A process for formulating an asphalt-polymer composition comprising as claimed in claim 2 wherein the mixing the asphalt, polymer mix and sulphur together occurs at a temperature of about 350° to about 380° F.

6. A process for formulating an asphalt-polymer composition comprising as claimed in claim 2 wherein said asphalt percent by weight is from about 90 to about 99 percent by weight of the asphalt-polymer composition and said polymer-sulphur mix is from about 10 to about 1 percent by weight of the asphalt-polymer composition, and said sulphur percent is from about 2 to about 4 percent by weight of said polymer-sulphur mix.

7. A process for formulating an asphalt-polymer composition comprising as claimed in claim 2 wherein:
   said asphalt percent by weight is from about 95 to about 99 percent by weight of the asphalt-polymer composition and said polymer-sulphur mix is from about 5 to about 1 percent by weight of the asphalt-polymer composition, said sulphur percent is from about 2 to about 4 percent by weight of said polymer-sulphur mix, and where said radial copolymer and said linear copolymer are in the ratio of from about 25 to 75 percent by weight to about 2.5 to 97.5 percent, respectively.

8. A process for formulating an asphalt-polymer composition comprising as claimed in claim 2 wherein the mixing the asphalt, polymer mix and sulphur together occurs at a temperature of about 280° to about 450° F.

9. An asphalt-polymer composition comprising:
   from about 80 to about 99.5 percent by weight of an asphalt
   from about 20 to about 0.5 percent by weight of a polymer-crosslinking reactant mix, where said polymer-crosslinking reactant mix is comprised of a radial copolymer which is a radial styrene-conjugated diene block copolymer with a weight average molecular weight between about 75,000 and 400,000, a linear copolymer which is a linear styrene-conjugated diene di-block copolymer with a weight average molecular weight from about 50,000 to about 300,000, where said radial copolymer and said linear copolymer are in the ratio of from about 50 to 50 percent by weight to about 2.5 to 97.5 percent by weight respectively, and a crosslinking agent in the amount of about 0.5 to about 10 percent by weight of the polymer-crosslinking reactant mix, wherein said crosslinking agent is selected from the group consisting of elemental sulphur, hydrocarbylpolysulphides, sulphur-donating vulcanization accelerators and vulcanization accelerators which do not donate sulphur.

10. A process for formulating an asphalt-polymer composition comprising;

combining from about 80 to about 99.5 percent by weight of an asphalt with from about 20 to about 0.5 percent by weight of a polymer-crosslinking reactant mix, wherein said polymer-crosslinking reactant mix is comprised of a radial copolymer which is a radial styrene-conjugated diene block copolymer with a weight average molecular weight between about 75,000 and 400,000, a linear copolymer which is a linear styrene-conjugated diene di-block copolymer with a weight average molecular weight from about 50,000 to about 300,000, with said radial copolymer and said linear copolymer being present in a ratio of from about 50 to 50 percent by weight to about 2.5 to 97.5 percent by weight, respectively, and a crosslinking agent in the amount of about 0.5 to about 10 percent by weight of the polymer-crosslinking reactant mix, wherein the crosslinking agent is selected from the group consisting of elemental sulphur, hydrocarbylpolysulphides, sulphur-donating vulcanization accelerators and vulcanization accelerators which do not donate sulphur, mixing the asphalt, polymer mix and crosslinking agent together.

11. A process for formulating an asphalt-polymer composition comprising:

Combining, from about 80 to about 99.5 percent by weight of an asphalt with from about 20 to about 0.5 percent by weight of a polymer-sulphur mix, where said polymer-sulphur mix is comprised of a radial copolymer which is a radial styrene-conjugated diene block copolymer which is a linear styrene-conjugated diene di-block copolymer with weight average molecular weight from about 50,000 to about 300,000 and where said radial copolymer and said linear copolymer are in the ratio of from about 500 to 50 percent by weight to about 2.5 to 97.5 percent, respectively, and from about 0.5 to abut 10 percent by weight as compared to said polymer mix of sulphur.

* * * * *

UNITED STATES PATENT AND TRADEMARK OFFICE
CERTIFICATE OF CORRECTION

PATENT NO. : 5,773,496
DATED : June 30, 1998
INVENTOR(S) : William E. Grubba

It is certified that error appears in the above-indentified patent and that said Letters Patent is hereby corrected as shown below:

On the title page, delete "Koch Industries, Inc." and insert

--Koch Enterprises, Inc.--

Signed and Sealed this

Twenty-sixth Day of September, 2000

Attest:

Q. TODD DICKINSON

*Attesting Officer*    *Director of Patents and Trademarks*